United States Patent Office 3,293,323
Patented Dec. 20, 1966

3,293,323
PHENOLIC ADDUCT OF HALOGENATED
BUTYL RUBBER
Irwin J. Gardner, Fanwood, Samuel B. Robison, Westfield, and Francis P. Baldwin, Summit, N.J., assignors to Esso Research and Engineering Company, a corporation of Delaware
No Drawing. Filed Sept. 10, 1962, Ser. No. 222,646
3 Claims. (Cl. 260—846)

This invention relates to modified isoolefin-diolefin copolymers and more particularly relates to a process for the preparation of phenolic adducts of halogenated butyl rubber, the products formed thereby and their vulcanizates.

In the past attempts to modify butyl rubber by means of the usual alkylation reactions has been accompanied by extensive molecular weight degradation of the polymer. It is also known to vulcanize halogenated butyl rubber by compounding it with a poly-functional phenol, e.g., resorcinol. Monohydroxy compounds, such as phenol itself, will not cure the halogenated butyl rubber.

It has now been discovered that alkylated derivatives of butyl rubber which can be cured may be prepared without any observable loss in molecular weight by reacting halogenated butyl rubber with a complex of a mono or polyhydroxy phenol and a Friedel-Crafts catalyst, e.g., a metal halide, such as $AlCl_3$, $ZnCl_2$, $FeCl_2$ and the like. Thus, in accordance with one embodiment of this invention, a halogenated polymer is prepared, e.g., a chlorinated copolymer of isobutylene with isoprene. This polymer is dissolved in a solvent, such as hexane, and reacted with a complex of the aryl hydroxy compound, e.g., phenol, and the metal halide, e.g., $AlCl_3$ at temperatures below 0° C. The resulting products have molecular weights at least as high and in many cases higher than the original halogenated butyl rubber.

This invention may be applicable to halogen containing rubbers and other polymers to include among others, polychloroprene (neoprene), chlorosulfonated polyethylene (Hypalon), halogenated natural rubber, halogenated copolymer of butadiene with styrene (GR–S), halogenated polyethylene, halogenated polypropylene, halogenated propylene copolymers, halogenated ethylene-butene copolymers, halogenated ethylene-pentene copolymers. However, the preferred polymer of the present invention is a halogenated butyl rubber copolymer of an isoolefin with a multiolefin.

The butyl rubber polymer which is subsequently halogenated is prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene. The mixture of monomers, preferably with 1 to 5 volumes of inert diluent, e.g., methyl chloride, should be cooled to a temperature between 0 and −200° C. and it is preferred that the temperature range be between −60° and −130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins. The polymerization reaction is rapid and the polymer precipitates out of the solution in the form of a slurry or flocculent white solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128, which is incorporated herein by reference.

The butyl rubber heretofore described is halogenated by a substitution reaction to incorporate at least 0.5 weight percent, preferably about 1.0 weight percent, of combined halogen, but not more than "X" weight percent fluorine or chlorine, or not more than about 3 "X" weight percent combined bromine or iodine therein, in accordance with the following equation:

$$X = \frac{M_3 L}{(100-L)M_1 + L(M_2+M_3)} \times 100$$

wherein $L$ = mole percent of the multiolefin in the polymer
$M_1$ = molecular weight of the isoolefin
$M_2$ = molecular weight of the multiolefin
$M_3$ = atomic weight of halogen.

In other words, there should be at least about 0.5 weight percent of combined halogen in the polymer but not more than about one atom of combined fluorine or chlorine or 3 atoms of combined bromine or iodine per double bond in the polymer. The halogenation is generally conducted between about −50° C. and about 200° C., and preferably between 20° and 50° C.; however, the temperature is dependent upon the particular halogenating agent which is used. The time interval is usually within the range of one minute to several hours, e.g., 3 minutes. The pressure may vary from 0.5 to 400 p.s.i.a.; however, atmospheric pressure is preferred. It is desirable to halogenate the butyl rubber copolymer while it is dissolved in a $C_4$ to $C_{10}$ hydrocarbon, a $C_4$ to $C_{10}$ halogenated hydrocarbon, carbon tetrachloride, chloroform, hexane, benzene and/or chlorobenzene. Suitable halogenating agents which may be employed are gaseous chlorine, liquid bromine, iodine monochloride, hydrogen fluoride, alkali metal hypobromites or hypochlorides, sulfur bromides or chlorides, bromo- or chloro-hydantoins, N-bromo-succinimide, and other common halogenating agents. The resulting halogenated butyl rubber polymer may be recovered by precipitating with an alcohol, acetone or any other non-solvent, and subsequently drying at a temperature between 0° and 180° C. within a pressure range from 1 to 760 mm. of Hg. Other methods for recovering the halogenated butyl rubber polymer from the hydrocarbon solution are conventional spray and drum drying techniques. Alternatively, the solution with the halogenated rubbery polymer therein can be injected into a vessel which contains steam and/or agitated hot water. The temperature must be high enough to flash off the solvent whereby an aqueous slurry of halogenated butyl rubber is formed therefrom. The halogenated butyl rubber is subsequently separated from this slurry by filtration. After a drying step, the polymer is recovered as a "crumb," a dense sheet, or a slab, depending upon the milling and extruding procedures which are used.

The halogenated copolymer generally has a viscosity average molecular weight between about 50,000 and 4,000,000. The mole percent unsaturation is usually between 0.5 and 15.0, preferably 0.6 and 5.0.

In accordance with the instant invention, the halogenated polymer is reacted in hydrocarbon solution with a complex of a heavy metal halide, such as $AlCl_3$, $ZnCl_2$, or $FeCl_3$ and a phenolic compound at a temperature below 0° C., preferably −10 to −40° C. Specific compounds within the scope of this invention are monohydroxyaromatics, e.g., phenol; dihydroxyaromatics, e.g., hydroquinone; resorcinol; catechol; orcinol; 4,4'-dihydroxydiphenyl; 2,2-bis-(p-hydroxy-phenyl) propane; 1,1-bis-(p-hydroxy-phenyl) nonane; tetrachlorobis-phenol-A; trihydroxyaromatics, e.g., phloroglucinol; pyrogallol; beta-resorcylaldoxime; bis-p-hydroxyphenylsulfone; quinone; quinhydrone; 1,4-naphthoquinone; 2,5-dihydroxyquinone.

The resulting products can be mixed in the usual manner on a mill. The usual curing agents are 0.5 to 3 parts per hundred of rubber (phr.) of sulfur and 0.5 to 5 phr. of accelerators, e.g., tetramethyl thiuram disulfide; 2-mercapto benzothiazole; benzothiazole disulfide; bis-4-ethylthiazole disulfide; diphenyl guanidine; butyraldehyde-aniline products; zinc dimethyl dithiocarbamate, thiazole guanadine; and aldehyde-amines. Other compounding agents which may be incorporated into the halogenated butyl rubber-phenolic adduct include non-elemental sulfur curing agents such as p-dinitroso benzene; p-quinone dioxime; and thiuram disulfide; antioxidants and stabilizers, e.g., stearic acid; zinc oxide; pigments and/or dyes; processing aids, e.g., waxes, resins and/or oils, extenders, e.g., non-volatile mineral oils and/or esters.

After the curing agents and other compounding agents have been incorporated into the adduct, the composition therefrom is extruded or molded into any desired form. The extruded admixture is subsequently cured by heating to a temperature between 250° and 270° F. for 240 to 60 minutes, or by heating to a relatively high temperature between 350° and 400° F. for 5 to 0.5 minutes, generally at temperatures of 200 to 400° F. for 240 to 0.5 minutes.

The phenolated halogenated butyl rubber may also be emulsified and used as a tire cord dipping composition or for the preparation of cast films.

The following examples are submitted to illustrate but not to limit the invention.

*Example 1*

5.62 g. of phenol were dissolved in 100 ml. of anhydrous ethyl ether under anhydrous conditions with stirring. The clear colorless solution was cooled to −80° C. 16.71 g. of anhydrous aluminum chloride were added incrementally. The ether solution became cloudy and a white precipitate formed.

191 g. of chlorobutyl (1.13 wt. percent Cl) were dissolved in 856 g. of $AlCl_3$ treated hexane. The solution was placed in a liter, 4 neck flask equipped with an efficient agitator and cooled to a reaction temperature of −35° C. The $AlCl_3$-phenol complex was added quantitatively. A temperature rise of 12° C. occurred on addition of the complex. The temperature dropped to. −35° C. and was maintained there for 8 hours.

At the end of the reaction the catalyst was deactivated by a two-fold molar addition (on $AlCl_3$) of methanol.

The product solution was washed 6 times with 100 ml. portions of distilled water. The pH of final wash was 4.5.

The alkylation of chlorobutyl with phenol was also carried out employing zinc chloride and ferric chloride to prepare the phenol-catalyst complex.

The zinc chloride-phenol complex was prepared with 5.62 g. phenol and 16.98 g. zinc chloride under conditions identical to the above.

The ferric chloride-phenol complex was prepared with 5.62 g. phenol and 20.19 g. $FeCl_3$ under conditions identical to the above.

The alkylation process and product workup procedure were the same as above.

*Example 2*

25.3 g. resorcinol and 107 g. of $AlCl_3$ were reacted as in Example 1.

690 g. of chlorobutyl were dissolved in sufficient $AlCl_3$-treated hexane to prepare 3000 g. of a 23 wt. percent polymer cement. The alkylation reaction was carried out at 25° C. to 30° C. After 4 hours, the reaction was terminated by addition (dropwise) of 192 g. methyl alcohol+30 ml. of hexane. The reaction mixture was cooled in a Dry Ice-alcohol bath during the addition of methanol. The reaction product was washed with 2 liters of distilled water and then precipitated with acetone. The modified polymer was purified by reprecipitation (twice) and then vacuum dried. Analysis of the polymer gave the following:

Chlorine=1.12 wt. percent; carbon 84.13 wt. percent; hydrogen=14.20 wt. percent; oxygen .32 wt. percent. Total by analysis=99.87 wt. percent. Intrinsic viscosity 1.328; $\overline{M}_v$=410,000.

*Example 3*

The resorcinol, phenol and catechol adducts of chlorobutyl were prepared, purified and dried as described in Example 2 and compounded according to the following recipe:

| | Phr. |
|---|---|
| Polymer | 100.0 |
| Polymethylol phenol resin | 10.0 |
| $ZnCl_2$ | 1.0 |
| ZnO | 5.0 |
| Carbon black | 50.0 |

The resulting mix was cured and the vulcanizate evaluated. The following data were obtained:

| Polymer (Nature of Mod.) | Cure Time, min. at 307° F. | 300% Modulus, p.s.i. | Tensile, p.s.i. | Elongation, percent |
|---|---|---|---|---|
| Chlorinated butyl rubber | 15 | 1,810 | 2,330 | 390 |
| Resorcinol adduct | 15 | 580 | 1,100 | 620 |
| Phenol adduct | 15 | 710 | 1,220 | 500 |
| Catechol adduct | 15 | 570 | 950 | 520 |
| Hydroxy ester of butyl rubber [1] | 15 | | (2) | |
| Butyl rubber | 15 | | (2) | |
| Chlorinated butyl rubber | 30 | | 2,240 | 220 |
| Resorcinol adduct | 30 | 1,330 | 1,830 | 390 |
| Phenol adduct | 30 | 1,480 | 2,070 | 400 |
| Catechol adduct | 30 | 1,250 | 2,050 | 440 |
| Hydroxy ester of butyl rubber | 30 | | (2) | |
| Butyl rubber | 30 | | (2) | |
| Chlorinated butyl rubber | 60 | | 2,250 | 240 |
| Resorcinol adduct | 60 | 1,950 | 2,170 | 340 |
| Phenol adduct | 60 | 1,960 | 2,020 | 320 |
| Catechol adduct | 60 | 1,870 | 1,980 | 320 |
| Hydroxy ester of butyl rubber | 60 | 410 | 1,760 | 720 |
| Butyl rubber | 60 | 560 | 1,940 | 680 |

[1] Hydroxy ester derivative of Butyl 268 prepared by reacting polymer with acetic acid, hydrogen peroxide and sulfuric acid.
[2] No cure.

The above data show that the adducts prepared from the mono and polyhydric phenols are similar in vulcanizate properties with the monohydric phenol having a slight advantage.

Example 4

Tire cord adhesives were prepared from the adducts by dispersing them in hexane. Nylon tire cord (denier 840/2) was dipped in these dispersions, dried and inserted in a carcass stock compounded of the following ingredients:

|  | Phr. |
|---|---|
| Chlorobutyl rubber | 100 |
| Carbon black | 50 |
| Polymethylol phenol resin | 10 |
| ZnO | 5 |

"H" adhesion samples were prepared using the test described by Lyons, Conrad and Nelson in Rubber Chemistry and Technology, V. 20:267 (1947). A cord length was treated by pulling it under light tension through a guide which held it beneath the surface of the dip. The original length and twist of the cord was preserved. Drying was accomplished by wrapping the treated wet cord length under light tension on a rack which was suspended in a circulating air oven to dry, and advance the resin at the temperature indicated. "H" test specimen strips were then prepared, cured for 30 minutes at 320° F. and tested using an Instron tester with a jaw separation rate of 10 inches per minute at room temperature. The force necessary to pull the nylon tire cord out of the block of rubber is shown below:

| Polymer: | $\bar{H}$, pds. @ R.T. |
|---|---|
| Chlorinated butyl rubber | 11.2 |
| Butyl rubber | 5.8 |
| Resorcinol adduct | 10.8 |
| Phenol adduct | 11.3 |
| Catechol adduct | 9.7 |

The phenolic adducts yield significantly higher adhesions than ordinary butyl rubber and the same as the chlorinated butyl rubber.

Example 5

Adhesive dip formulations were prepared from butyl rubber, chlorinated butyl rubber, and the adducts of phenol, resorcinol and catechol with chlorinated butyl rubber using the following formulation:

|  | Phr. |
|---|---|
| Polymer | 100 |
| MPC Black | 50 |
| Resorcinol | 10 |
| Paraformaldehyde | 8.2 |
| ZnO | 5.0 |

Adhesions were obtained with the carcass stock used in Example 4 and a butyl rubber carcass stock having the following formulation:

|  | Phr. |
|---|---|
| Butyl rubber 325 (unsat. 1.9–2.3 mole percent) | 100 |
| MT Black | 15 |
| HAF Black | 35 |
| N-methyl-N, 4-dinitrosoaniline | 1 |
| Plasticizer oil | 8.0 |
| Non-reactive phenol resin (Amberol ST 137X) | 7 |
| Pentalyn X-tackifier resin [1] | 3 |
| ZnO | 5 |
| Sulfur | 2 |
| Tellurium diethyl dithiocarbamate | 1.3 |
| Benzothiazyl disulfide | 1.0 |

[1] Pentaerythritol ester of hydrogenated rosin.

The following results were obtained:

| Polymer | H-pounds Carcass Stock | |
|---|---|---|
|  | Chlorinated Butyl Rubber | Regular Butyl Rubber |
| Butyl 268 (unsat. 1.5–1.9 mole percent) | 12.2 | 9.3 |
| Chlorinated butyl rubber | 12.6 | 10.2 |
| Resorcinol adduct | 13.9 | 11.3 |
| Phenol adduct | 13.2 | 11.7 |
| Catechol adduct | 14.0 | 9.7 |

Example 6

The phenol adduct of chlorobutyl rubber was emulsified in an Eppenbach dispersator using the following formula:

|  | G. |
|---|---|
| Polymer solution (22.4 wt. percent in hexane) | 236 |
| Na lauryl sulfate emulsifier (Sipex UB) | 4.16 |
| Water | 256 |

Solvent was removed and the emulsion stripped to 27 wt. percent by distillation. Tire cord adhesive dips were prepared from the resulting latex according to the following formulation:

| Latex, grams | 100 |
|---|---|
| Resorcinol, grams | 22.73 |
| Formaldehyde (37% aqueous), grams | 34.74 |
| ZnO (50% dispersion), grams | 0.52 |
| Water, g. | 27.30 |
| pH | 8.32 |
| Wt. percent solids | 20.0 |
| Molar ratio F/R | 2:1 |

"H" adhesion samples were prepared using the butyl rubber carcass stock of Example 5. The following results were obtained:

| RF Dip Age, hours | Cord Drying Temp., 6' at °F. | "H" Adhesion Pds. | |
|---|---|---|---|
|  |  | 77° F. | 250° F. |
| 13 | 350 | 16.3 | 7.6 |
| 37 | 325 | 16.6 | 7.8–10.6(9.4) |
|  | 350 | 18.4–19.4(19.0) | 8.5 |
|  | 375 | 16.7 | 8.0–10.5(9.0) |
|  | 400 | 13.6 | 6.8 |
| 67 | 350 | 17.9 | 8.7 |

Example 7

A resorcinolated butyl latex was prepared by reaction of chlorobutyl with resorcinol by the following technique and emulsification of the resulting cement. 448 g. of chlorobutyl (1.13% Cl) were dissolved in 2263 ml. of AlCl$_3$-treated hexane. The solution was placed in 5 liter, 4 neck flask equipped with an efficient agitator, cooled to reaction temperature of −35° C., and 16.4 g. of C.P. resorcinol and 20.1 g. C.P. anhydrous AlCl$_3$ added. The reaction time at this temperature was 190 minutes. While in the reaction vessel the polymer solution was blanketed with nitrogen. The catalyst was deactivated by addition of methanol (twice molar concentration of AlCl$_3$). The cement was then washed 6 times with 500 ml. of distilled water. The pH of the final wash was 4.4. The washed cement was emulsified in a colloid mill using the following surfactants:

| 28% Alipal CO-433 [1] | g | 158.5 |
|---|---|---|
| Igepal CO-430 [2] | g | 5.22 |
| Darvan 1 [3] | g | 5.0 |
| 5% NaH$_2$PO$_4$ | ml | 164 |
| Quadrophos [4] | g | 22.54 |

[1] Na polyoxyethylenenonyl phenol sulfate.
[2] Polyoxyethylenenonyl phenol containing four ethylene oxide units.
[3] Sodium salt of polymerized alkyl aryl sulfonic acid.
[4] Sodium tetraphosphate.

The emulsion was stripped at atmospheric pressure to 26.6 wt. percent solids.

Tire cord adhesive dips were prepared and matured at several pHs as shown in the following table.

and reduced the stability of the latex resulting in premature gelling in most cases, the highest adhesions (as shown in Table II) were obtained under these same conditions.

TABLE I.—"H" ADHESION OF BUTYL RUBBER TO NYLON USING RESORCINOLATED BUTYL LATEX

| Dip Formulation | A | B | C | D | E | F | G |
|---|---|---|---|---|---|---|---|
| Latex (26.6 wt. percent), g | 50.0 | 50.0 | 50.0 | 50.0 | 50.0 | 50.0 | 50.0 |
| Resorcinol, g | 1.0 | 1.0 | 1.0 | 1.0 | 1.0 | 1.0 | |
| 37% Formaldehyde, g | 1.67 | 1.67 | 1.67 | 1.67 | .84 | .42 | 1.67 |
| 50% Zinc Oxide Dispersion, g | .60 | .60 | .60 | .60 | .60 | .60 | .60 |
| pH | 3.3 | 5.0 | 8.3 | 10.0 | 8.3 | 8.3 | 8.3 |
| Ratio (Resorcinol/Formaldehyde) | 1:2 | 1:2 | 1:2 | 1:2 | 1:1 | 1:1 | |

| Latex Age, hrs. | Cord Drying Temp., 6' at °F. | A | | B | | C | | D | | E | | F | | G | |
|---|---|---|---|---|---|---|---|---|---|---|---|---|---|---|---|
| | | 77 | 250 | 77 | 250 | 77 | 250 | 77 | 250 | 77 | 250 | 77 | 250 | 77 | 250 |
| 2 | 250 | 6.4 | | 6.5 | | 8.1 | | 12.0 | | 5.6 | | 6.4 | | 7.2 | |
| | 350 | 10.1 | | 8.2 | | 10.2 | | | | 10.7 | | 7.8 | | 6.5 | |
| 5 | 350 | | | | | | | 12.0 | | | | | | | |
| 8 | 350 | | | | | | | 14.3 | | | | | | | |
| 24 | 350 | 9.2 | | | | [1] 19.0 | | 13.3 | | 11.4 | | | | | |
| | 400 | 13.4 | | | | 17.0 | | 10.1 | | 15.2 | | | | | |
| 48 | 300 | | | | | [2] 18.7 | 8.4 | | | 14.2 | | | | | |
| | 350 | | | | | [3] 18.3 | [6] 10.0 | | | 13.2 | | | | | |
| 168 | 275 | 3.0 | | 6.1 | | 15.0 | 7.0 | | | 9.1 | | 7.9 | | 9.1 | |
| | 350 | 8.1 | | 7.9 | | [4] 18.2 | 9.0 | | | 12.9 | | 9.3 | | 8.8 | |
| | 400 | 10.1 | | 12.0 | | | 8.0 | | | 15.3 | 9.4 | 11.0 | | 8.4 | |
| 192 | 350 | | | | | [5] 18.2 | 6.7 | | | | | | | | |
| | 400 | | | | | | | | | 17.4 | [7] 9.4 | | | | |
| | 425 | | | | | | | | | | | | | | |
| Percent Extractables from Latex Film cured 2 hrs. at 300° F. in air oven [a] [b] | | 3.34 | | 4.55 | | 15.12 | | | | 12.43 | | 5.74 | | 15.86 | |

[a] Emulsifiers 26% of total solids.
[b] Extracted in n-hexane 72 hrs. at 25° C.
Range of "H" Values: [1] (18.4–20.0)  [2] (17.7–19.9)  [3] (17.0–19.6)  [4] (18.1–18.3)  [5] (17.5–18.6)  [6] (9.6–10.8)  [7] (8.3–10.2).

The "H" test adhesion values were determined using the butyl rubber carcass stock of Example 6. The tire cords employed were of 1650 denier/2 ply construction in the case of rayon and 840 denier/2 ply construction for nylon unless otherwise indicated. The adhesions were determined as in Example 6 and the data are shown in the following table:

The extractability data, Table I, of cast films from latex dips aged 41 hours, dried at room temperature and cured for 2 hours at 300° F. in an oven, indicates the modified butyl was vulcanized by the RF resin forming a stable 3 dimensional network.

The nature of the present invention having been thus

TABLE II.—"H" ADHESION OF BUTYL RUBBER TO NYLON USING CREAMED RESORCINOLATED BUTYL LATEX

| Dip Formulation | A | B | C | D |
|---|---|---|---|---|
| Latex (49.3 wt. percent), g | 25.0 | 25.0 | 25.0 | 25.0 |
| Resorcinol, g | 1.1 | 1.1 | 1.1 | 1.1 |
| 37% Formaldehyde, g | 2.76 | 1.84 | 0.92 | 1.84 |
| 50% Zinc Oxide, g | .66 | .66 | .66 | |
| Water, g | 24.0 | 23.6 | 22.9 | 23.2 |
| pH | 8.3 | 8.3 | 8.3 | 8.3 |
| Ratio (Resorcinol/Formaldehyde) | 1:3 | 1:2 | 1:1 | 1:2 |

| Latex Age, hrs. | Cord Drying Temp., 6' at °F. | "H" Adhesion at R.T. and 250° F., lbs. | | | | | | | |
|---|---|---|---|---|---|---|---|---|---|
| | | 77 | 250 | 77 | 250 | 77 | 250 | 77 | 250 |
| 17 | 350 | Gelled on standing | | 16.9 | 8.3 | 12.4 | 6.8 | 15.8 | 8.4 |
| 41 | 350 | | | Gelled | | 18.5 | [1] 9.6 | Gelled | |
| | 375 | | | | | 16.5 | 8.1 | | |
| | 400 | | | | | 11.7 | 5.9 | | |
| 62 | 250 | | | | | 15.4 | 8.2 | | |
| | 300 | | | | | 15.6 | 8.6 | | |
| | 350 | | | | | 17.1 | [2] 10.4 | | |
| 62 Rayon Cord | 250 | | | | | 21.5 | 11.4 | | |
| | 300 | | | | | 21.1 | 10.5 | | |
| 134 | 350 | | | (1680 Denier Merge 2135 Nylon) | | [3] 23.8 | [4] 11.6 | | |

Range of Values: [1] (8.7–10.6)  [2] (9.9–11.4)  [3] (21.3–25.0)  [4] (10.2–12.8).

The above data show that the most favorable adhesion values were obtained with pH adjustment to 8.3 and a resin prepared with a 1 mole resorcinol to 2 moles formaldehyde ratio. After 17 hours aging of the creamed product, which process removed a portion of emulsifier fully set forth and specific examples of the same given, what is claimed as new and useful and desired to be secured by Letters Patent is:

1. The process which comprises reacting in hydrocarbon solution at a temperature below 0° C. a halogen containing rubbery copolymer of an isoolefin having from 4 to 7 carbon atoms with from 0.5 to 30 parts by weight of a conjugated diolefin having from 4 to 10 carbon atoms with a complex of a phenol and a Friedel-Crafts catalyst chosen from the group consisting of $AlCl_3$, $ZnCl_2$ and $FeCl_3$.

2. The adduct of a halogen containing rubbery copolymer of an isoolefin having from 4 to 7 carbon atoms with from 0.5 to 30 parts by weight of a conjugated diolefin having from 4 to 10 carbon atoms and a complex of a phenol and a Friedel-Crafts catalyst chosen from the group consisting of $AlCl_3$, $ZnCl_2$ and $FeCl_3$.

3. An adhesive dip comprising a latex of a composition defined in claim 2 containing resorcinol and formaldehyde in the molar ratio of 1:2.

References Cited by the Examiner

UNITED STATES PATENTS

| | | | |
|---|---|---|---|
| 2,943,664 | 7/1960 | Baldwin | 260—29.7 |
| 3,007,889 | 11/1961 | Smith | 260—43 |
| 3,028,358 | 4/1962 | Rosamilia | 260—43 |
| 3,144,426 | 8/1964 | Burke et al. | 260—846 |
| 3,147,316 | 9/1964 | Minckelet et al. | 260—846 |
| 3,151,096 | 9/1964 | Kordzinski et al. | 260—846 |
| 3,165,496 | 1/1965 | Fusco et al. | 260—846 |
| 3,189,567 | 6/1965 | Giller | 260—846 |
| 3,220,964 | 11/1965 | Giller | 260—846 |

MURRAY TILLMAN, *Primary Examiner.*

JAMES A. SEIDLECK, *Examiner.*

E. J. TROJNAR, P. LIEBERMAN, *Assistant Examiners.*